US007375301B1

(12) United States Patent
Noujaim

(10) Patent No.: US 7,375,301 B1
(45) Date of Patent: May 20, 2008

(54) MODULAR ANODE SUPPORT MEMBER FOR PLASMA SPRAY GUN

(76) Inventor: Majed Noujaim, 52 Wildwood Dr., Manchester, CT (US) 06040

( * ) Notice: Subject to any disclaimer, the term of this patent is extended or adjusted under 35 U.S.C. 154(b) by 22 days.

(21) Appl. No.: 11/584,845

(22) Filed: Oct. 23, 2006

(51) Int. Cl.
*B23K 10/00* (2006.01)

(52) U.S. Cl. ........................... 219/121.47; 219/121.48; 219/121.49; 219/121.5

(58) Field of Classification Search ........... 219/121.48, 219/121.49, 121.5, 121.51, 121.52, 121.36, 219/74, 75, 121.47; 315/111.21; 313/231.31, 313/231.41
See application file for complete search history.

(56) References Cited

U.S. PATENT DOCUMENTS 4,967,055 A * 10/1990 Raney et al. ............ 219/121.5
6,946,617 B2 * 9/2005 Brandt et al. .......... 219/121.49
2001/0007320 A1 * 7/2001 Severance et al. ..... 219/121.48

OTHER PUBLICATIONS

MultiCoat Component Manual 958'001-22, Spray Gun F4 Plasma Coating, Mar. 1999, Sulzer Metco.

* cited by examiner

*Primary Examiner*—Mark Paschall
(74) *Attorney, Agent, or Firm*—McCormick, Paulding & Huber LLP

(57) ABSTRACT

The present invention provides a modular anode support member for a plasma spray gun including an outer sleeve, an inner sleeve, and a coolant tube connectable to the outer sleeve. The outer sleeve having a cylindrical sidewall defining a central opening through a length thereof for receiving the inner sleeve. The outer sleeve including a mounting member for mounting the outer sleeve and an associated spray gun to a spray gun manipulator. The inner sleeve for receiving an anode housing is removably disposed in the central opening of the outer sleeve and includes forward and rearward portions defined by a stepped central bore through a length thereof. The forward portion for receiving an anode housing therein, the rearward portion for carrying coolant to and from the anode housing. Alignment means are provided for fixing the relative position of the inner sleeve and outer sleeve in assembly.

20 Claims, 11 Drawing Sheets

Center Section

MODULAR ANODE SUPPORT MEMBER FOR PLASMA SPRAY GUN

FIELD OF THE INVENTION

The present invention generally relates to plasma spray guns which use an electric arc to excite a gas and produce a thermal plasma of very high temperatures, wherein coating materials are introduced into the thermal plasma, melted and projected onto a substrate to form a coating on the substrate. More particularly, the present invention is directed to an improved modular anode support member for use in plasma spray guns including F4 plasma spray guns manufactured by Sulzer Metco AG of Switzerland (herein referred to as the "F4 plasma spray gun" or the "F4 spray gun").

BACKGROUND OF THE INVENTION

Generally, plasma spraying includes spraying of molten or heat softened material onto a substrate to provide a coating on the substrate. Typically, material in the form of powder is injected into a very high temperature plasma flame where it is rapidly heated and accelerated to a high velocity. The hot material, directed toward the substrate, impacts a surface of the substrate and rapidly cools forming a coating thereon.

A plasma spray gun usually includes a cathode and anode both of which are water-cooled. The anode being formed in the shape of a nozzle of the spray gun. An inert gas, such as argon, is directed around the cathode and through the nozzle. A plasma flame is initiated by a high voltage discharge which causes localized ionization and a conductive path for an arc to form between the cathode and anode. Resistance heating from the arc causes the gas to reach extreme temperatures and ionize forming a plasma flame directed through the nozzle. A coating material injected into the plasma flame is rapidly heated and accelerated through the nozzle toward a substrate to be coated. The heated material impacts the substrate where it rapidly cools forming a coating thereon.

Generally, a plasma spray gun using an inert gas such as argon can produce a thermal plasma of very high temperatures, up to 20,000 degrees Centigrade. Typically, the electrical current used to produce the arc between the cathode and anode is approximately 500 Amperes or more. Due to the high temperatures involved with the above-described plasma spray guns, a water cooling system is also provided for cooling both the anode and cathode and associated parts of the spray gun.

The F4 plasma spray gun is widely used in the thermal spraying industry and has become one of the predominant plasma spray guns currently used. Referring to FIGS. 1 and 2, a prior art F4 plasma spray gun includes a rear section 9 for supporting an electrode 8 which provides the negative pole or cathode of the plasma gun. A center section 5 supports an anode holder 4 and includes a mount for attaching the spray gun to a manipulator. The anode holder 4 receives a water cooled nozzle 3 which forms the positive pole or anode for the electric arc. Referring to FIG. 2, the center section 5 of the F4 gun also includes a water inlet tube 10 attached to a coolant tube block (not shown).

Although not clearly shown in FIGS. 1 and 2, one of the drawbacks of the F4 gun is that major components of the spray gun, including the center and rear sections thereof, are made from multiple pieces of lightweight brass brazed together. Thus, if one component of the center or rear sections of the plasma gun becomes damaged or worn, the entire center section, or entire rear section of the gun must be replaced. Typically, these components are expensive pieces such that replacement thereof is costly and significantly adds to the operating costs of the F4 plasma gun.

The manufacturing process for the center section of the F4 gun requires the brazing of multiple parts, one to the other, followed by pressure testing of the brazed joints. Thus, each of a multiplicity of parts is first machined or otherwise formed prior to the assembly thereof via brazing. Following the assembly process the parts typically undergo a finishing process wherein the parts are machined to final specifications. Thereafter, the finished products are tested, i.e., the brazed joints of the center section require testing (typically pressure testing) to confirm the integrity of the joints and the resulting seal formed between the brazed together parts. Any parts that fail a pressure test are presumably scrapped or recycled, which further adds to the cost of the manufacturing process.

Typically, in conjunction with the maintenance of the of the F4 spray gun, the gun is taken apart and inspected on a regular basis. The nozzle and electrode as well as O-rings positioned between adjacent components are replaced periodically. If any portion of the center section is worn or otherwise damaged, the entire center section must be replaced. The center section of the F4 spray gun can also be damaged during disassembling and re-assembling of the spray gun, which also results in the replacement of the entire center section.

Another disadvantage of the center section of the F4 plasma spray gun is that the coolant tube at an outlet end thereof is inserted into an opening in a coolant tube block and fluidly sealed thereto via a brazed joint therebetween. This brazed joint is somewhat fragile and susceptible to damage and/or leaks caused by twisting of the coolant tube during the coupling or uncoupling of a coolant source line to the coolant tube. Again, if the coolant tube is damaged or a leak occurs, the entire center section must be replaced prior to operating the spray gun.

A further disadvantage of the center section of the F4 plasma spray gun is the cost of replacement thereof. Due to the complex manufacturing process described above, the cost of the center section is relatively expensive and adds considerably to the cost of operating the spray gun especially since the functional life of the center section is relatively short due in part to the unitary design thereof.

Based on the foregoing, it is the general object of the present invention to provide an improved modular anode support member for use with plasma spray guns including an F4 spray gun that improves upon, or overcomes the problems and drawbacks associated with the prior art.

SUMMARY OF THE INVENTION

The present invention provides an improved modular anode support member for a plasma spray gun including an outer sleeve and an inner sleeve. A coolant tube connectable to the outer sleeve is also provided.

The outer sleeve having a cylindrical sidewall defining a central opening through a length thereof for receiving the inner sleeve. A mounting member extends outwardly from an outer surface of the sidewall and is formed integrally with the sidewall for mounting the outer sleeve and an associated spray gun to a spray gun manipulator. The outer sleeve also includes a coolant tube mount extending outwardly from an outer surface of the sidewall and defining a coolant inlet in fluid communication with an inlet conduit extending through the sidewall to the central opening. The coolant tube mount also being formed integrally with the sidewall.

The inner sleeve having a generally cylindrical shape and being removably disposed in the central opening of the outer sleeve. The inner sleeve including forward and rearward portions defined by a stepped central bore through a length of the inner sleeve. An annular shoulder defined by the stepped central bore extends through the rearward portion. An outer surface of the rearward portion defines a circumferential coolant groove aligned with the inlet conduit of the outer sleeve. The rearward portion further defining a pair of inlet passageways in fluid communication with the coolant groove at one end and opening through a surface of the shoulder into the central bore at an opposing end. The inlet passageways for carrying coolant from the inlet conduit to an anode housing. The rearward portion further defining a pair of outlet passageways extending through a length of the shoulder for carrying heated coolant returning from an anode housing through said inner sleeve. The forward portion of the inner sleeve for receiving an anode housing therein. The rearward portion of the inner sleeve for carrying coolant to and from the anode housing.

The present invention anode support member also includes alignment means for fixing the position of the inner sleeve relative to the outer sleeve when in the inner and outer sleeve are assembled together. In a preferred embodiment, a pin extending outwardly from an outer surface of the inner sleeve is received in a slotted opening defined by the outer sleeve for fixing the relative angular orientation between the inner and outer sleeves in assembly.

A seal disposed between the inner sleeve and the outer sleeve adjacent the coolant groove on either side thereof, fluidly seals the inlet conduit and the coolant groove of the anode support member.

A coolant tube removably attaches to the outer sleeve at the coolant tube mount. The coolant tube includes a one-piece structure having a threaded fitting at each end thereof. At an inlet end of the coolant tube, a threaded portion is connectable to a coolant supply tube (not shown). The coolant tube for transporting coolant from a coolant supply to the anode end of the plasma spray gun for cooling the anode and associated parts of the spray gun.

Accordingly, the present invention inner and outer sleeve assembly provide a separable water-cooled anode support member of a plasma spray gun and carry an electric current to an anode thereof.

One advantage of the present invention is that each of the component parts thereof is separable one from the other such that each component part is replaceable independent of the other components of the anode support member.

Another advantage of the present invention modular anode support member is that each component part of the anode support member including the inner and outer sleeves and the coolant tube is machined from a single piece of stock material such that the manufacture of the component parts as well as the assembled anode support member does not require any brazing for securing multiple parts together.

A further advantage of the present invention modular anode support member is that the configuration of the coolant passageways therein as well as the manufacturing processes required for the same provide a finished assembly that does not require any pressure testing following the manufacture of the component parts thereof nor of the assembled anode support member.

A still further advantage of the present invention anode support member is that the configuration of the inner and outer sleeves and the separable coolant tube therefor provide a robust and durable support for the anode holder of an F4 spray gun and an improvement over the prior art.

The foregoing and still other objects and advantages of the present invention will be more apparent from the following detailed explanation of the preferred embodiments of the invention in connection with the accompanying drawings wherein throughout the figures, like reference numerals describe like elements of the invention.

DETAILED DESCRIPTION OF THE INVENTION

Figure 1:
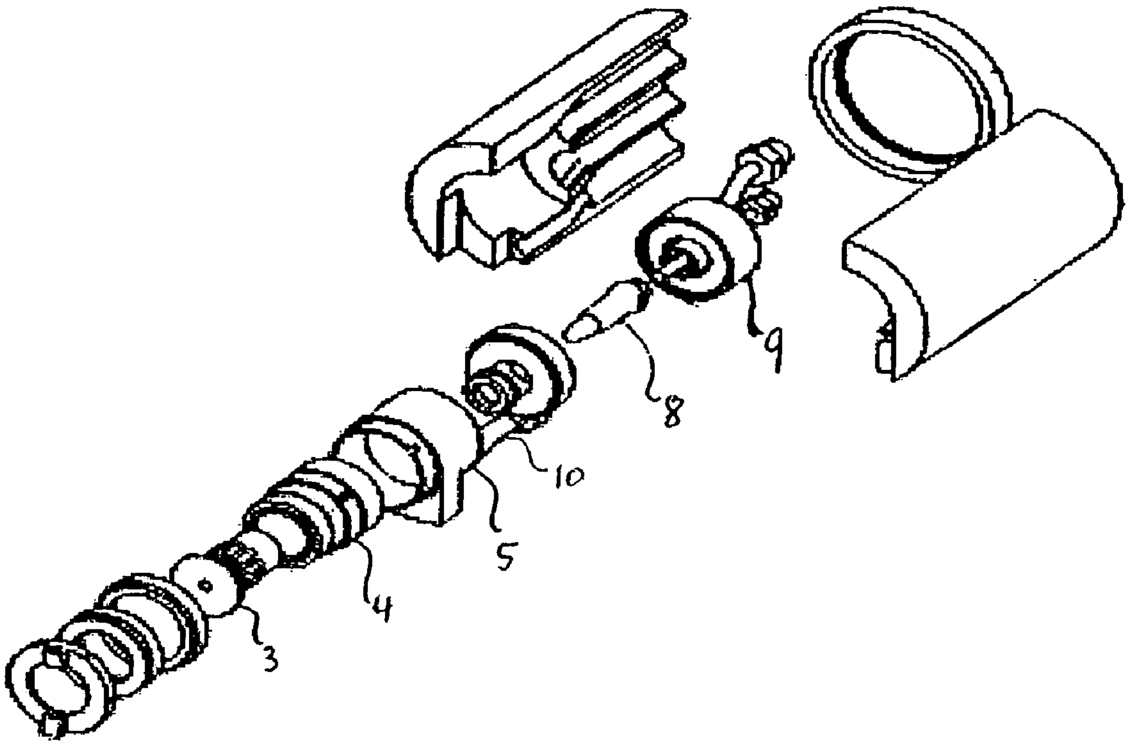
Fig. 1 (Prior Art)
FIG. 1 is an exploded perspective view of a prior art F4 plasma spray gun.
Figure 2:
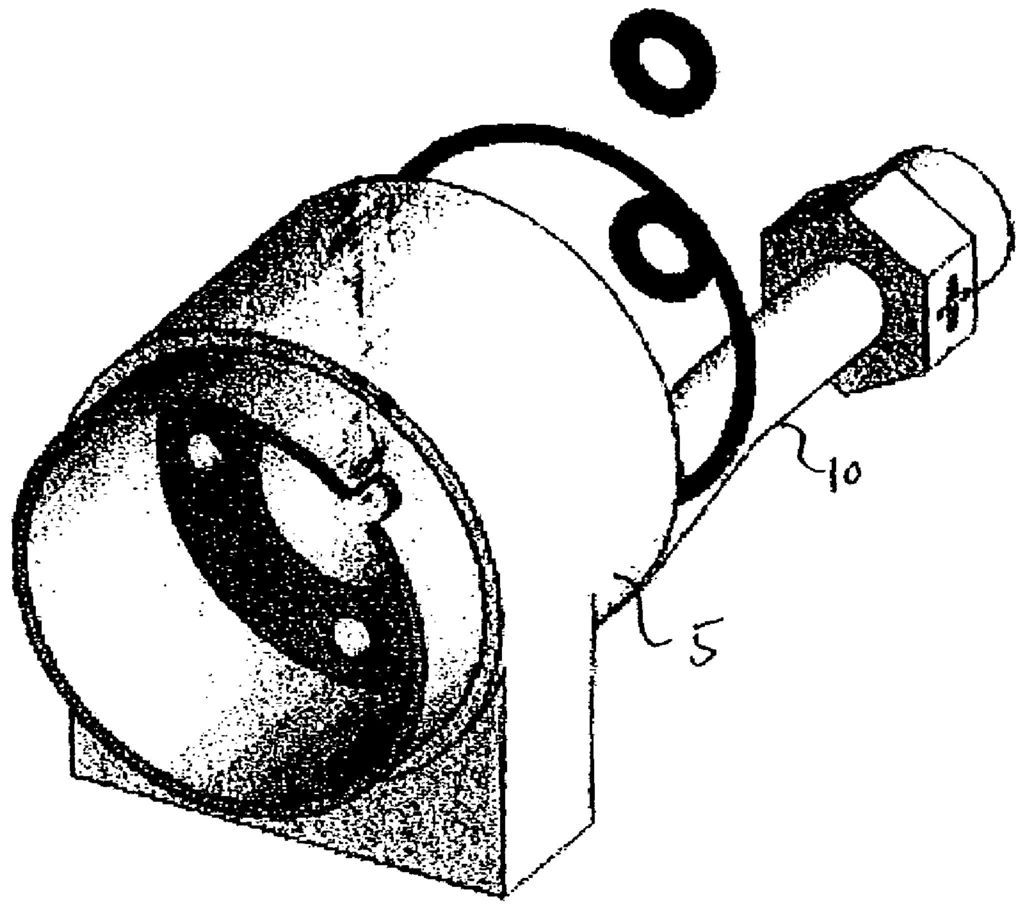
Fig. 2 (Prior Art)
FIG. 2 is a perspective view of a center section of the F4 plasma spray gun of FIG. 1.
Figure 3:
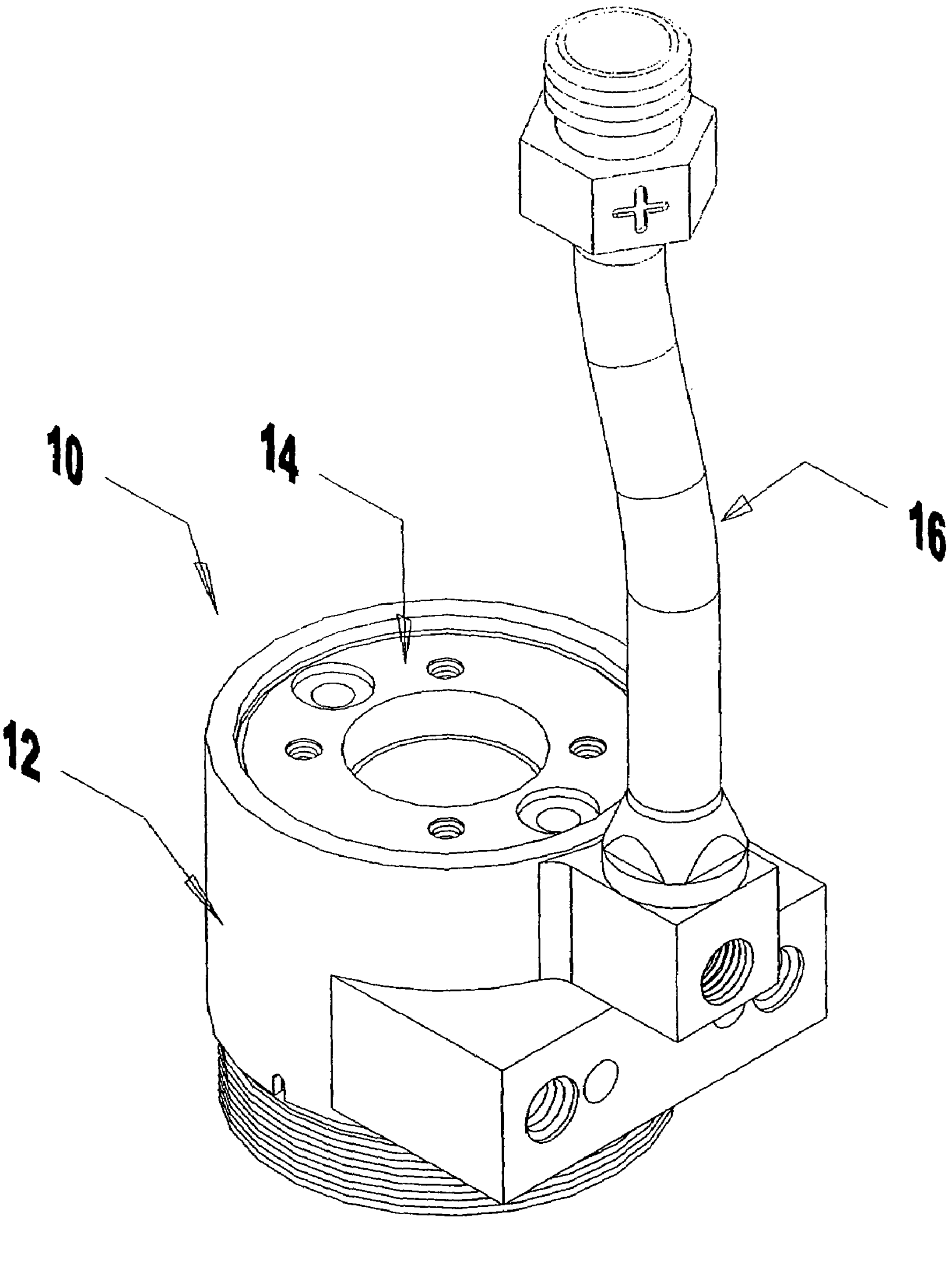
FIG. 3 is a perspective view of one embodiment of a modular anode support member in accordance with the present invention for use with a plasma spray gun.

Referring to the FIG. 3, the present invention improved anode support member for use with a plasma spray gun is generally referred to with the reference numeral 10. The anode support member 10 includes an outer sleeve 12 and an inner sleeve 14. A coolant tube 16, for carrying coolant to the anode support member 10 connects to the outer sleeve 12. The anode support member 10 is compatible with an F4 plasma spray gun and can be used to replace the center section of an F4 spray gun.

Figure 4:
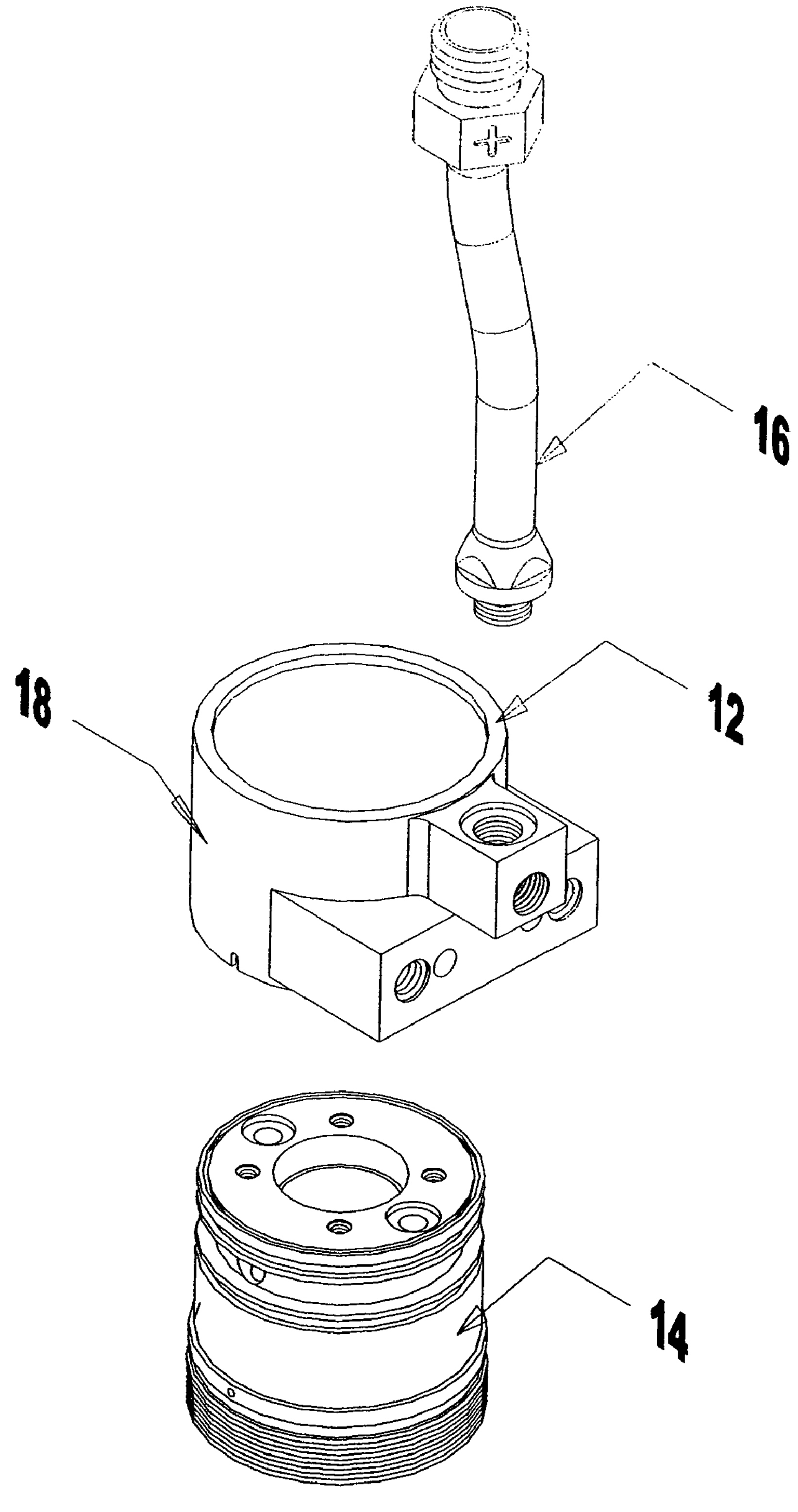
FIG. 4 is an exploded view of the anode support member of FIG. 3.
Figure 5:
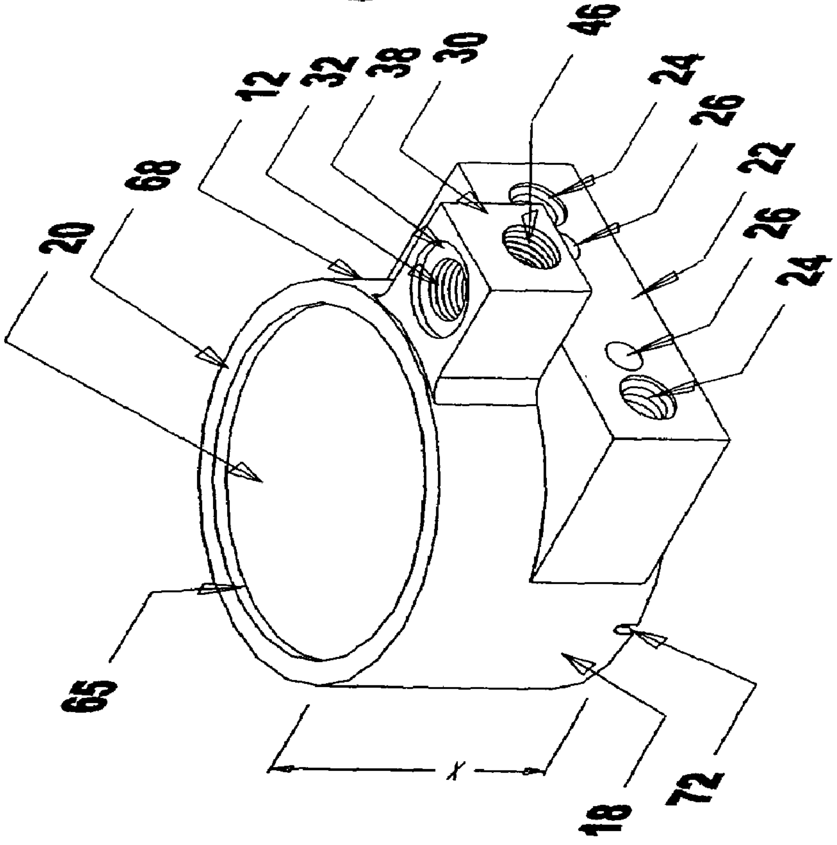

Referring to FIGS. 3-5, the outer sleeve 12 includes a generally cylindrical sidewall 18 which defines a central opening 20 through a length X of the outer sleeve. A mounting member 22 is formed integrally with the sidewall 18 and extends outwardly therefrom. The mounting member 22 defines a pair of threaded holes 24, 24 opening through a surface of the mounting member opposite the sidewall 18 for receiving corresponding bolts for mounting the anode support member 10 and an associated plasma spray gun (not shown) to a spray gun manipulator (also not shown). Additionally, the mounting member 22 defines a pair of smooth bore holes 26, 26 one each adjacent the threaded holes 24, 24 for use in aligning the mounting member relative to a corresponding gun mount on a spray gun manipulator. The smooth bore holes 26 for receiving an alignment pin (not shown) for aligning the mounting member 22 relative to a mating part. The mounting member 22 is formed integrally with the sidewall 18 from a solid mass of material, preferably brass, such that the mounting member is durable and fixedly aligned with the outer sleeve 12 for accurately aligning an associated spray gun relative to a spray gun manipulator. Thus, regardless of the number of times the outer sleeve 12 and an associated spray gun is removed and/or coupled to a spray gun manipulator, the mounting member 22 remains fixedly aligned with the outer sleeve 12 for accurately aligning an associated spray gun relative to a spray gun manipulator. Further, the one piece mounting member 22 and outer sleeve 12 provide for the secure mounting of the outer sleeve 12 and associated spray gun to a spray gun manipulator regardless of the number of times the spray gun is mounted or dismounted from a manipulator.

Figure 10:
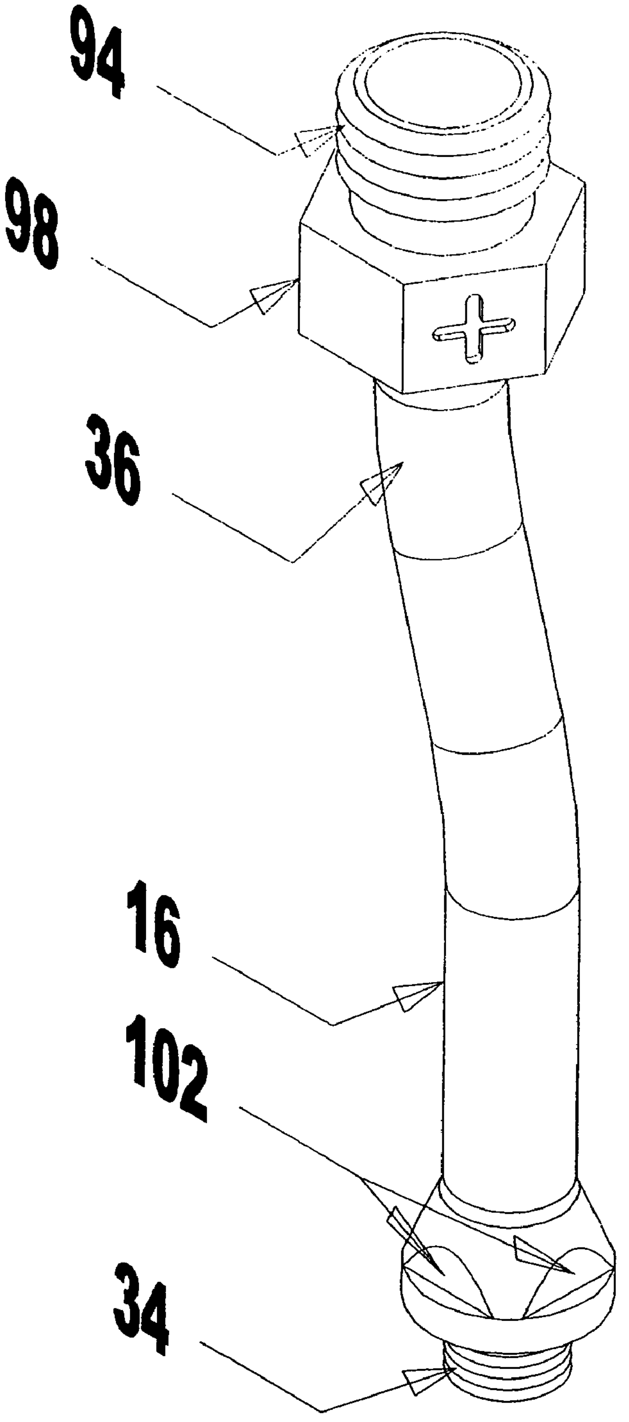
FIGS. 10 and 11 are perspective views of a coolant tube of the anode support member of FIG. 3.
Figure 11:
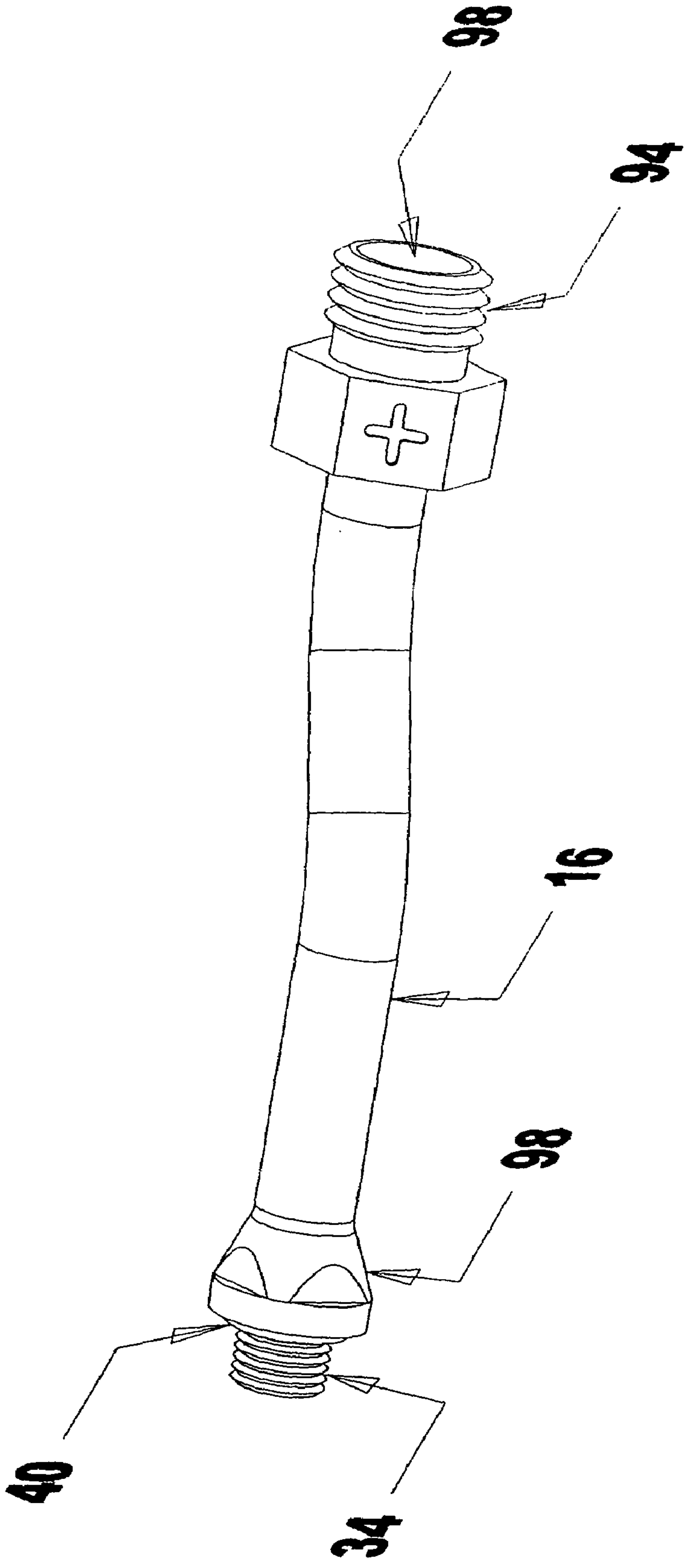

The outer sleeve 12 further defines a coolant tube mount 30 also formed integrally with the sidewall 18. The coolant tube mount 30 defines a threaded coolant inlet 32 for receiving an outlet end 34 of a coolant tube 36 (FIG. 10). An annular seat 38 surrounding the coolant inlet 32 receives a seal 40 for fluidly sealing a connection between the coolant tube 36 and the coolant inlet 32. (FIG. 11). The coolant inlet 32 is in fluid communication with an inlet conduit 42 extending through the sidewall 18 to the central opening 20 of the outer sleeve 12. The sidewall 18 of the outer sleeve 12 defines an outlet 44 of the inlet conduit 42. The inlet conduit 42 is formed in part by a bore 46 extending through the coolant tube mount 30 generally perpendicular to the inlet 32 and through the sidewall 18. An end of the bore 46 opposite the sidewall 18 is threaded for receiving a plug (not shown).

Referring to FIGS. 3, 4 and 7-9, the inner sleeve 14 is generally cylindrical in shape for removable insertion into the central opening 20 of the outer sleeve 12. The inner sleeve 14 defines a stepped central bore 50 through a length Y thereof. A shoulder 52 extending throughout a rearward portion 54 of the inner sleeve 14 is defined by the stepped central bore 50. A surface 56 of the shoulder 52 separates a rearward portion 54 from a forward portion 58 of the inner sleeve 14. The forward portion 58 defines a cylindrical cavity 59 for receiving an anode holder (not shown) therein.

Figure 7:
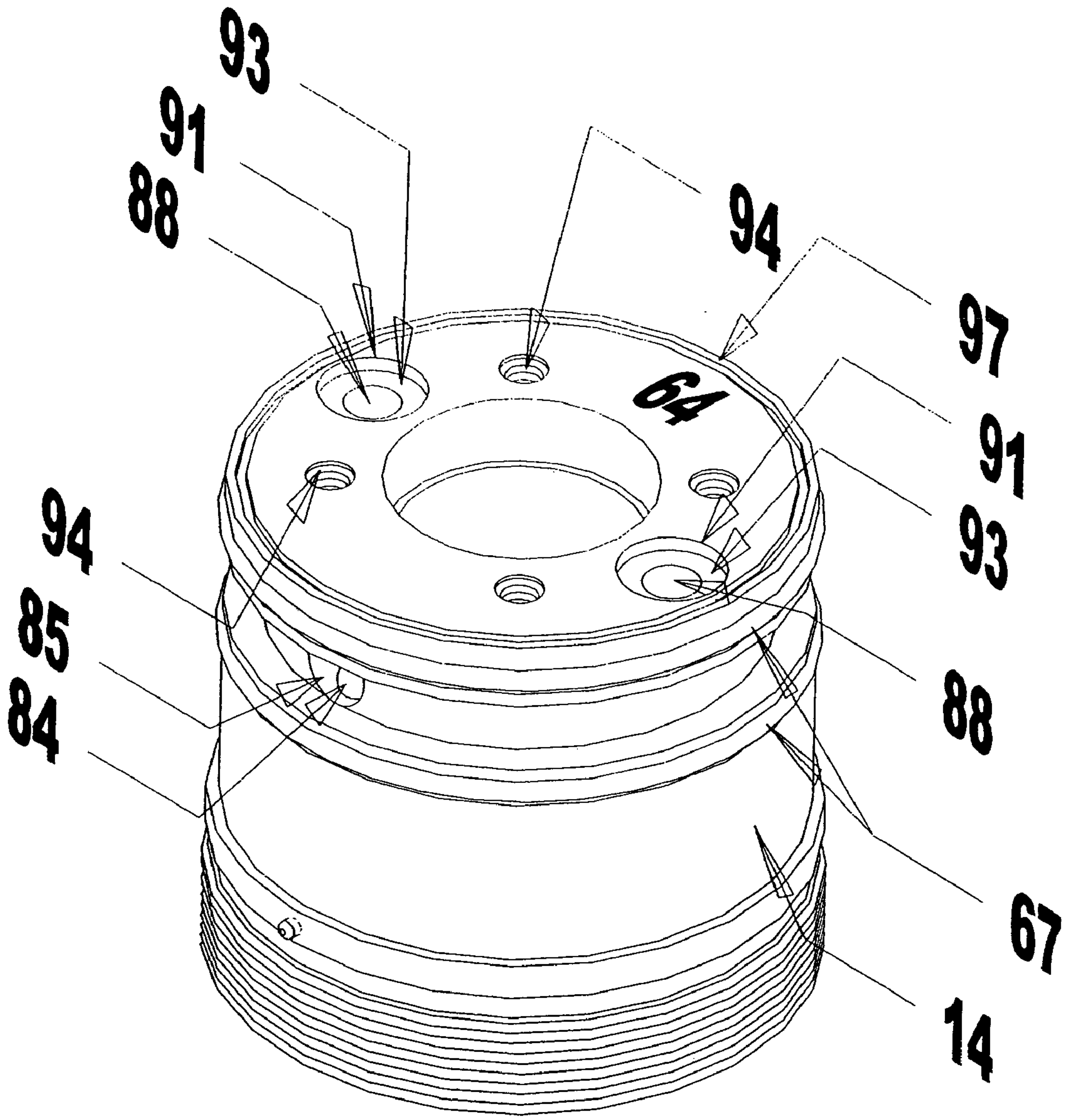
FIGS. 7-9 are various perspective views of an inner sleeve of the anode support member of FIG. 3.
Figure 8:
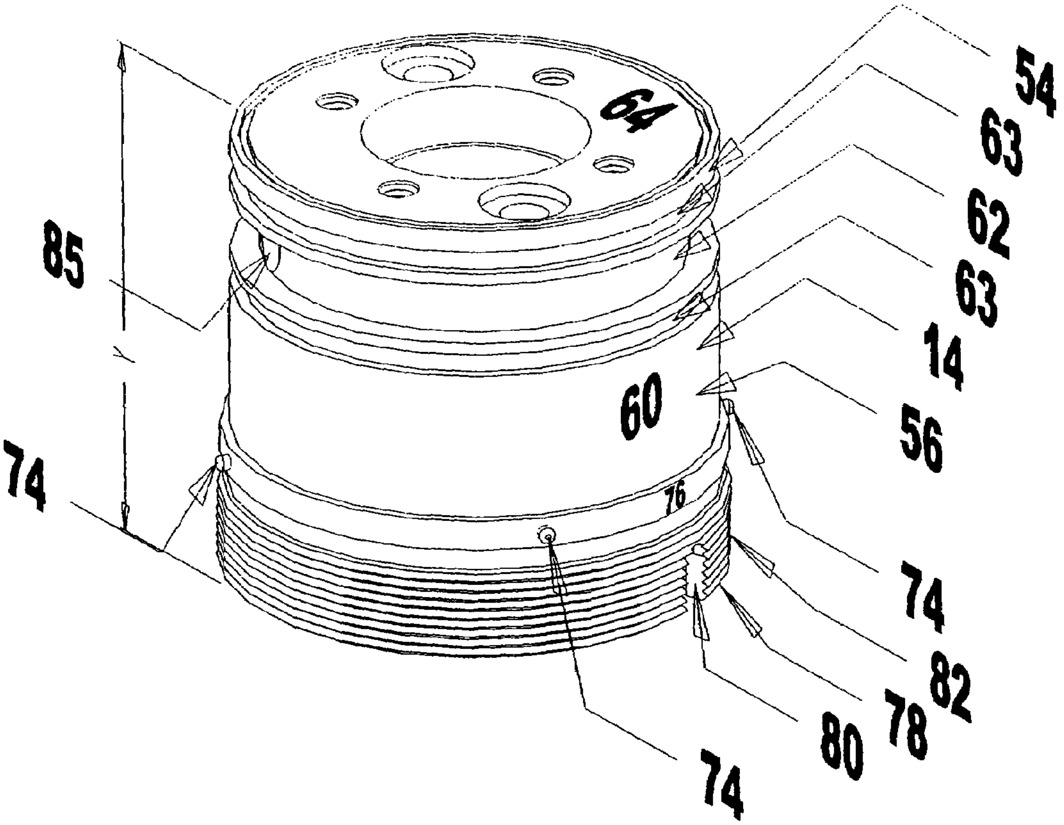

Referring to FIGS. 7 and 8, an outer surface 60 of the rearward portion 54 of the inner sleeve 14 defines a coolant groove 62 which aligns with the outlet 44 of the inlet conduit 42 when the inner sleeve 14 is inserted in the central opening 20 of the outer sleeve 12 and assembled therewith. Thus, coolant entering the coolant inlet 32 travels through the inlet conduit 42 and into the coolant groove 62 of the inner sleeve 14. A seal groove 63 defined by the outer surface 60 on either side of the coolant groove 62 receives a seal 67 such as an O-ring. The seals 67 prevent coolant entering the coolant groove 62 from the inlet conduit 42 from passing into the area between the inner and outer sleeves 14 and 12 respectively.

Figure 6:
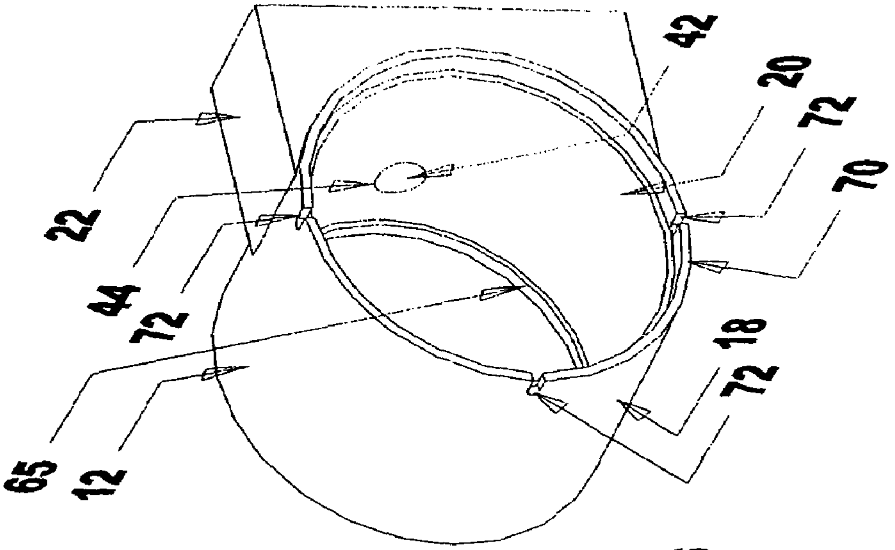
FIGS. 5 and 6 are perspective views of an outer sleeve of the anode support member of FIG. 3.

Referring again to FIG. 6, the sidewall 18 of the outer sleeve 12 defines an annular flange 65 extending into the central opening 20 at a first end 68 of the outer sleeve for engaging an end surface 64 of the inner sleeve 14 when the inner sleeve is fully inserted into the outer sleeve 12. The annular flange 65 is for establishing the lengthwise positioning of the inner sleeve 14 relative to the outer sleeve 12.

A second end 70 of the outer sleeve 12 defines a plurality of alignment slots 72 spaced apart about the circumference of the sidewall 18 for engaging corresponding alignment pins 74 extending outwardly from an outer surface 76 of the forward portion 58 of the inner sleeve 14. (See FIGS. 6 and 8). The alignment slots 72 and corresponding alignment pins 74 establish and serve to fix a predetermined angular alignment between the inner sleeve 14 and outer sleeve 12 in assembly. Proper angular alignment between the inner and outer sleeves 12 and 14 respectively, is necessary to ensure alignment of the anode support member 10 and adjacent portions of the spray gun.

Referring to FIG. 8, an edge 78 of the forward portion 58 of the inner sleeve 14 defines an alignment opening 80 for establishing alignment of an anode holder (not shown) relative to the inner sleeve 14. A threaded end 82 of the inner sleeve 14 receives a retaining nut (not shown) for securing an anode holder (also not shown) disposed in the cavity 59 of the inner sleeve.

Figure 9:
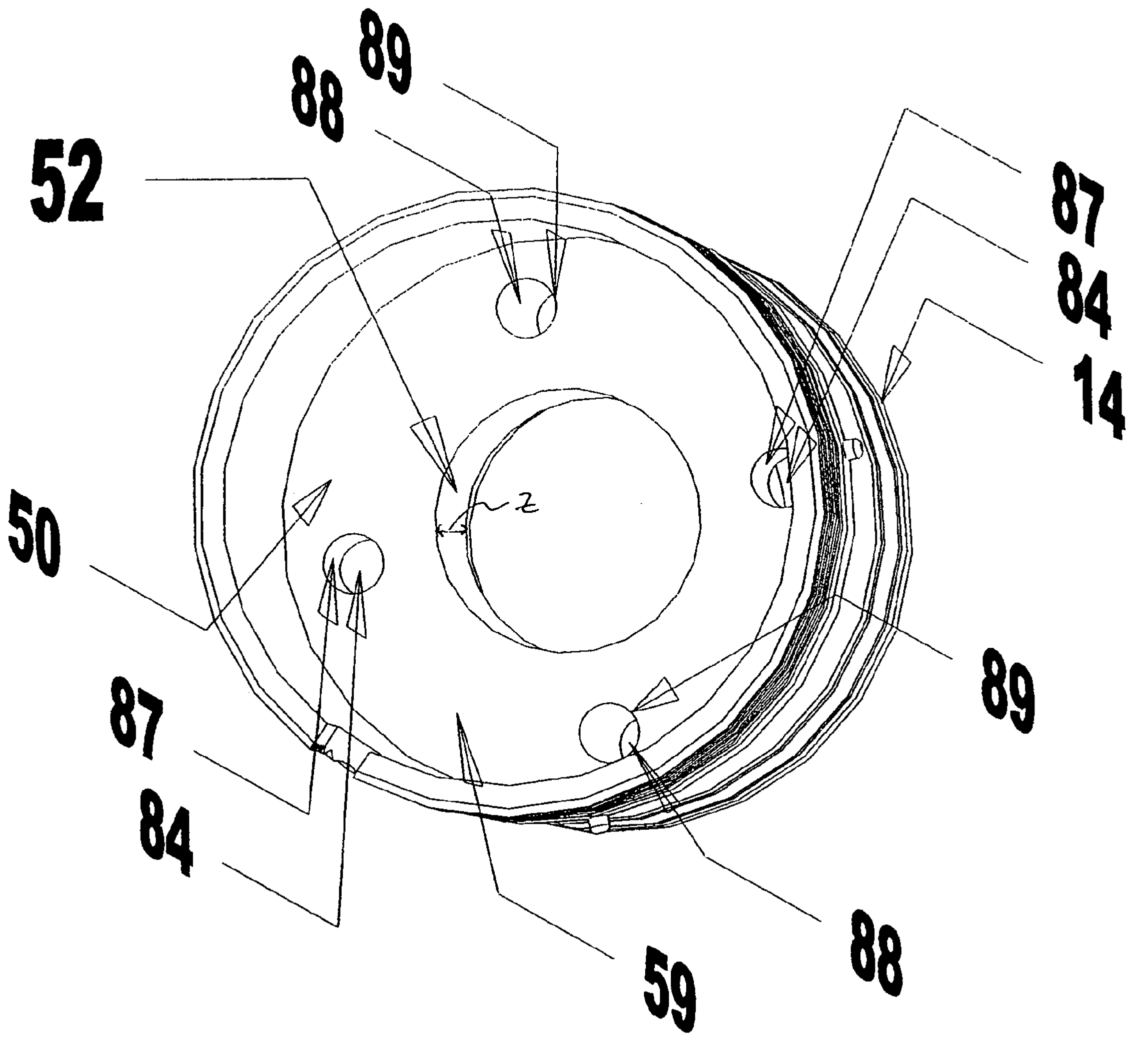

Referring to FIGS. 7-9, the rearward portion 54 of the inner sleeve 14 defines a pair of inlet passageways 84, 84 each having an inlet 85 in fluid communication with the coolant groove 62 at one end thereof and an outlet 87 at an opposing end opening through the surface 56 of the shoulder 52 into the cavity 59 in the forward portion 58 of the inner sleeve. The inlet passageways 84, 84 carry coolant delivered to the anode support member 10 via the coolant tube 16 through the inner sleeve 14 to a corresponding port defined by an anode holder (not shown) disposed in the cavity 59 of the forward portion 58 of the inner sleeve. Coolant for cooling an anode end of the spray gun including the inner sleeve 14, the outer sleeve 12, an associated anode holder (not shown), and a nozzle (also not shown) is delivered through the inlet passageways 84, 84.

The rearward portion 54 of the inner sleeve 14 also defines a pair of outlet passageways 88, 88 for carrying heated coolant from an anode holder (not shown) through a length Z of the shoulder 52 to a rear section of the spray gun (not shown). The outlet passageways 88, 88 each having inlet openings 89 defined in part by the surface 56 of the shoulder 52 which are connectable with corresponding ports of an anode holder. Each outlet passageway 88, 88 having an outlet port 91 defined by the end surface 64 of the inner sleeve 14. A seal seat 93 surrounding each of the outlet ports 91 is defined by the end surface 64 for receiving a seal (not shown) for fluidly sealing a connection between each of the outlet passageways 88, 88 and a mating component of the plasma spray gun.

The end surface 64 also defines a plurality of threaded holes 94 for coupling the inner sleeve 14 to an adjoining component of the plasma gun (not shown), typically an insulator member. Thus, the anode support member 10 couples at one end to an insulator (not shown) which electrically separates the anode support member from a cathode end of the gun, and at an opposing end, to an anode holder (also not shown). Further, the end surface 64 defines an annular seal groove 97 for receiving a seal (not shown) disposed between the end surface of the inner sleeve 14 and an adjoining portion of the spray gun.

Referring to FIGS. 4, 10 and 11, a coolant tube 16 removably attaches to the outer sleeve 12 at the coolant tube mount 30. The coolant tube 16 includes a one-piece structure having a threaded fitting at each end thereof. At an inlet end 98 of the coolant tube 16, a threaded portion 94 is connectable to a coolant supply tube (not shown) for cooling the anode end of the plasma spray gun. A threaded outlet end 34 of the coolant tube 16 connects to the coolant inlet 32. The coolant tube 16 further defines a flared portion 98 near the outlet end 34 for strengthening the coolant tube near the connection with the coolant mount 30. Each of the inlet and outlet ends 98 and 34 respectively, of the coolant tube 16 define a geometric-shaped portion for use in tightening the coolant tube relative to an adjoining part. The inlet end 98 includes a hexagon-shaped portion 100 such that a standard end wrench can be use to hold the inlet end 98 of the coolant tube 16 relative to another fitting. The outlet end 34 defines flat portions 102 also receivable in an ordinary end wrench for tightening the connection between the coolant tube 16 and the coolant tube mount 30. The coolant tube 16 is formed of a metal such as brass for carrying a positive electric current to the anode of the plasma spray gun.

The coolant tube 16 transports coolant such as water from a source to the anode end of the plasma spray gun. Typically, coolant water contained in a closed system is used for cooling a plasma spray gun so that certain properties of the water can be closely controlled. For example, if even a small trace of lime is present in the coolant water the nozzle and electrode of the spray gun can be rapidly destroyed.

The outer sleeve 12, the inner sleeve 14 and the coolant tube 16 of the present invention are each individual components which can be easily separated for inspection, cleaning and replacement of one or more of the components apart from the others. For example, if the coolant tube 16 is damaged during the dismantling of an associated spray gun, only the coolant tube need be replaced as opposed to the entire anode support member or center section of the prior art F4 spray gun. Further, if the inner sleeve 14 is worn or damaged, only the inner sleeve need be replaced and is easily disassembled from the outer sleeve 12 for replacement thereof.

Additionally, the separable inner and outer sleeves 14 and 12 respectively, of the present invention, allow for the thorough cleaning of these parts during the regular maintenance of the spray gun which is not available in the one piece configuration of the prior art.

The present invention anode support member 10 includes the outer sleeve 12, inner sleeve 14 and coolant tube 16 being configured such that each of these separable components is formed from a single piece of material such that there is no brazing or coupling of separate pieces to form these component parts of the anode support member 10. Accordingly, the inner and outer sleeves 14 and 12, as well as the coolant tube 16 of the present invention anode support member 10 do not require any pressure testing of the coolant passageways therein following the manufacture of these components. The only testing required of the above-identified components of the present invention anode support member 10 includes measuring the parts to ensure conformance of the machined parts with any necessary manufacturing tolerances to provide a functional component. This is a vast improvement over the prior art wherein the center section of an F4 spray gun is manufactured from a plurality of component parts brazed together to form fluid tight connections therebetween and wherein each center section must undergo multiple pressure tests following the manufacture thereof to confirm the integrity of the brazed joints between the multiple components thereof.

Accordingly, since there is no brazing involved and no pressure testing of brazed joints, the machined components of the present invention anode support member 10 including the inner and outer sleeves 14 and 12 respectively, and the coolant tube 16 are less expensive to manufacture than the prior art center section of an F4 spray gun.

Further, in the present invention anode support member 10, if the inner sleeve 14 has a worn O-ring seat, only the inner sleeve need be replaced. Similarly, if the coolant tube 16 is damaged, the coolant tube 16 is replaceable separately from the other components of the anode support member 10. Additionally, if the outer sleeve 12 is damaged or worn or otherwise needs replacing, the outer sleeve is replaceable separately from the inner sleeve 14 and the coolant tube 16.

In one embodiment of the present invention, the coolant tube 16 is manufactured from a solid piece of hexagonal brass stock and machined and drilled to form a straight tube. Following the machining thereof, the coolant tube 16 is threadably coupled to the outer sleeve 12 and secured thereto via coupling the threaded end 94 to the threaded coolant inlet 32. The coolant tube 16 is then bent in a press to conform to the shape of a corresponding cavity in the housing of a spray gun (not shown). Because the coolant tube 16 is formed of one piece, the tube is first tightened to the coolant tube mount 30 and then bent to conform to the shape of the cavity for receiving the tube in the housing. Accordingly, if the coolant tube 16 is replaced, the process is repeated, wherein the replacement tube is first secured to the outer sleeve 12 and then bent to conform to the housing.

Figure 12:
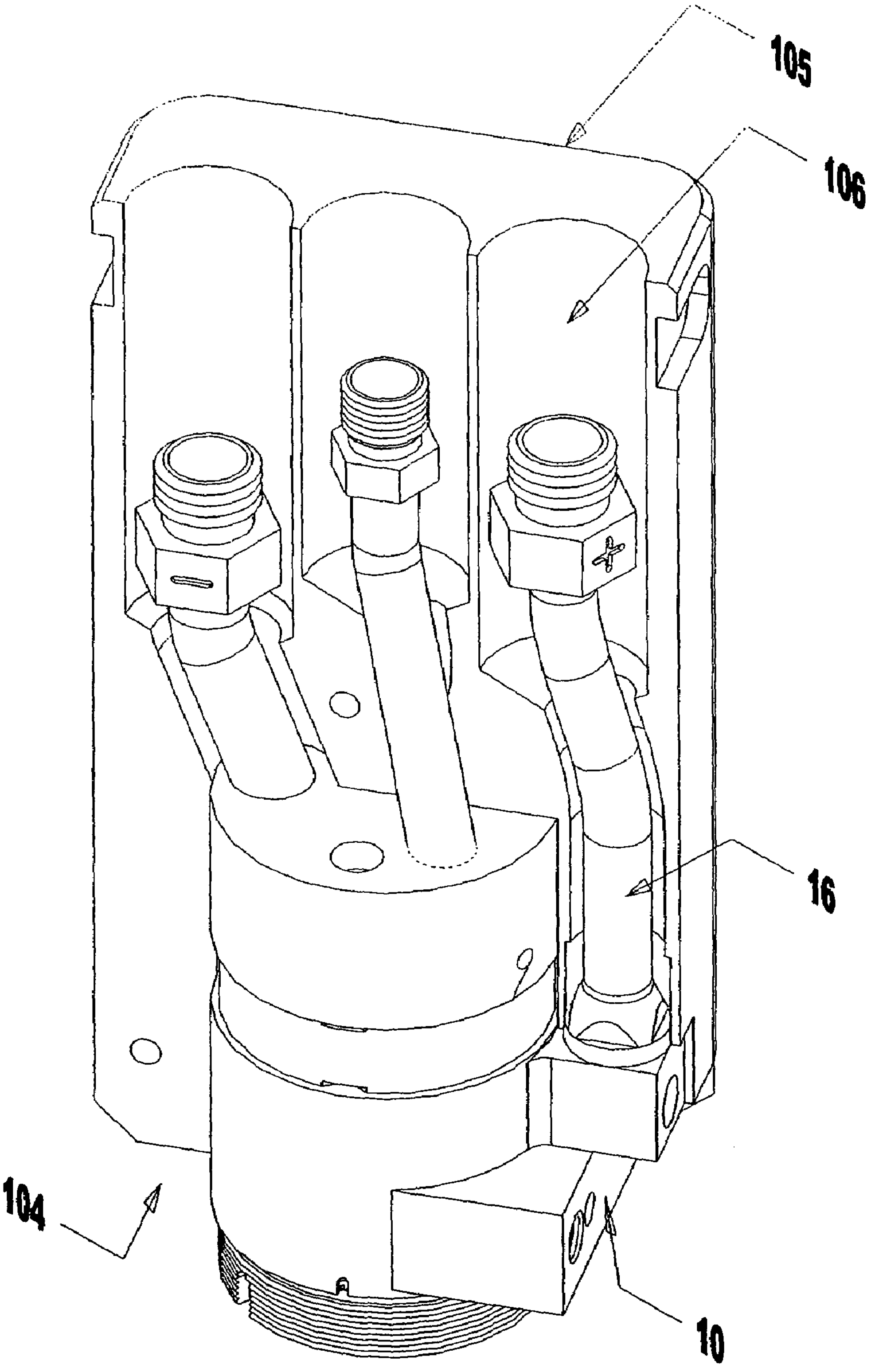
FIG. 12 is a partial cut-away view of a plasma spray gun employing an anode support member in accordance with the present invention.

Referring to FIG. 12, a plasma spray gun 104 includes a housing 105 defining a cavity 106 for receiving the coolant tube 16. As shown in the drawing, the coolant tube 16 is bent to conform to the shape of the cavity 106. In other spray guns applications, the coolant tube 16 may be configured differently to conform with the associated parts of a particular spray gun.

The foregoing description of embodiments of the present invention have been presented for the purpose of illustration and description and are not intended to be exhaustive or to limit the invention to the form disclosed. Obvious modifications and variations are possible in light of the above disclosure. The embodiments described were chosen to best illustrate the principals of the invention and practical applications thereof to enable one of ordinary skill in the art to utilize the invention in various embodiments and with various modifications as suited to the particular use contemplated. It is intended that the scope of the invention be defined by the claims appended hereto.

What is claimed is:

1. A modular anode support member for a plasma spray gun comprising:

an outer sleeve having a cylindrical sidewall defining a central opening through a length of said outer sleeve for receiving an inner sleeve, a mounting member extending outwardly from an outer surface of said sidewall and formed integrally with said sidewall, said mounting member for mounting said outer sleeve and an associated spray gun to a spray gun manipulator, a coolant tube mount extending outwardly from an outer surface of said sidewall and formed integrally with said sidewall, said coolant tube mount defining a coolant inlet in fluid communication with an inlet conduit extending through said sidewall to said central opening, an inner sleeve having a generally cylindrical shape removably disposed in said central opening of said outer sleeve, said inner sleeve having forward and rearward portions defined by a stepped central bore through a length thereof, an annular shoulder defined by said stepped central bore extending through said rearward portion, an outer surface of said rearward portion defining a circumferential coolant groove aligned with said inlet conduit of said outer sleeve, said forward portion for receiving an anode housing therein, said rearward portion defining inlet and outlet passageways for carrying coolant to and from an anode housing, said inlet passageways in fluid communication with said coolant groove, alignment means for fixing the relative position of said inner sleeve in said outer sleeve, at least one seal disposed between said inner sleeve and said outer sleeve adjacent said coolant groove for fluidly sealing said inlet conduit and said coolant groove, and wherein said inner and outer sleeve assembly provide a separable water-cooled anode support member of a plasma spray gun and carry an electric current to an anode thereof.

2. The modular anode support member according to claim 1 wherein said sidewall of said outer sleeve further defines a flange extending into said central opening and engaging an end surface of said rearward portion of said inner sleeve for lengthwise positioning of said inner sleeve relative to said outer sleeve, said end surface opposing said surface of said shoulder.

3. The modular anode support member according to claim 1 wherein said coolant inlet includes a threaded portion for receiving an end of a coolant tube.

4. The modular anode support member according to claim 1 wherein said coolant tube mount further defines a seat surrounding said coolant inlet for receiving a seal.

5. The modular anode support member according to claim 1 further comprising a coolant tube removably coupled to the coolant tube mount.

6. The modular anode support member according to claim 5 wherein said coolant tube includes a one-piece structure having a threaded fitting formed on at least one end thereof.

7. The modular anode support member according to claim 5 wherein said coolant tube is shaped to be received in a corresponding cavity in a housing of a plasma spray gun.

8. The modular anode support member according to claim 6 wherein said coolant tube further defines a flared portion adjacent at least one of said fittings for strengthening said coolant tube at said fitting.

9. The modular anode support member according to claim 1 wherein said alignment means includes said outer sleeve defining at least one alignment opening for receiving a corresponding alignment member coupled to said inner sleeve.

10. The modular anode support member according to claim 1 wherein said alignment means includes at least one alignment member extending outwardly from an outer surface of said inner sleeve.

11. The modular anode support member according to claim 1 wherein an outer surface of said rearward portion further defines at least one circumferential seal groove on each side of said coolant groove for receiving a seal therein.

12. The modular anode support member according to claim 11 wherein said inner sleeve further comprises a seal disposed in each of said seal grooves.

13. The modular anode support member according to claim 1 wherein said rearward portion further defines a pair of inlet passageways in fluid communication with said coolant groove at one end and opening through a surface of said shoulder into said central bore at an opposing end for carrying coolant from said inlet conduit to an anode housing.

14. The modular anode support member according to claim 1 wherein said rearward portion further defines a pair of outlet passageways extending through a length of said shoulder for carrying heated coolant returning from an anode housing through said inner sleeve.

15. An improved plasma spray gun of the type having a water cooled anode and cathode, the anode being shaped in the form of a nozzle for receiving a plasma gas therethrough, the plasma gas being initiated by an arc formed between the cathode and the anode, wherein a coating material fed into the plasma gas near an outlet of the nozzle is heated and propelled towards a substrate via the plasma gas, the improvement being a modular anode support member of the plasma spray gun comprising:

an outer sleeve having a cylindrical sidewall defining a central opening through a length of said outer sleeve for receiving an inner sleeve therein, a mounting member extending outwardly from an outer surface of said sidewall and formed integrally with said sidewall, said mounting member for mounting said outer sleeve and said plasma spray gun to a spray gun manipulator, a coolant tube mount extending outwardly from an outer surface of said sidewall and formed integrally with said sidewall, said coolant tube mount defining a coolant inlet in fluid communication with an inlet conduit extending through said sidewall to said central opening, an inner sleeve for receiving an anode housing therein, said inner sleeve having a generally cylindrical shape removably disposed in said central opening of said outer sleeve, said inner sleeve having forward and rearward portions defined by a stepped central bore through a length thereof, an annular shoulder defined by said stepped central bore extending through said rearward portion, an outer surface of said rearward portion defining a circumferential coolant groove aligned with said inlet conduit of said outer sleeve, said rearward portion further defining a pair of inlet passageways in fluid communication with said coolant groove at one end and opening through a surface of said shoulder into said central bore at an opposing end for carrying coolant from said inlet conduit to an anode housing, said rearward portion further defining a pair of outlet passageways extending through a length of said shoulder for carrying heated coolant returning from an anode housing through said inner sleeve, said forward portion for receiving an anode housing therein, said rearward portion for carrying coolant to and from said anode housing, alignment means fixing the relative position of said inner sleeve in said outer sleeve, at least one seal disposed between said inner sleeve and said outer sleeve adjacent said coolant groove for fluidly sealing said inlet conduit and said coolant groove, and wherein said inner and outer sleeve assembly provide a separable water-cooled anode support member of said plasma spray gun and carry an electric current to an anode thereof.

16. The modular anode support member according to claim 15 wherein said sidewall of said outer sleeve further defines a flange extending into said central opening and engaging an end surface of said rearward portion of said inner sleeve for lengthwise positioning of said inner sleeve relative to said outer sleeve, said end surface opposing said surface of said shoulder.

17. The modular anode support member according to claim 15 further comprising a coolant tube removably coupled to the coolant tube mount.

18. The modular anode support member according to claim 15 wherein said alignment means includes said outer sleeve defining at least one alignment opening for receiving a corresponding alignment member coupled to said inner sleeve.

19. The modular anode support member according to claim 15 wherein said alignment means includes at least one alignment member extending outwardly from an outer surface of said inner sleeve.

20. The modular anode support member according to claim 15 wherein an outer surface of said rearward portion further defines at least one circumferential seal groove on each side of said coolant groove for receiving a seal therein.

* * * * *